UNITED STATES PATENT OFFICE.

JOHN H. MITCHELL, OF WASHINGTON, DISTRICT OF COLUMBIA, ASSIGNOR OF ONE-HALF TO N. BUNCH, OF SAME PLACE.

HOOF-SALVE.

SPECIFICATION forming part of Letters Patent No. 437,401, dated September 30, 1890.

Application filed July 12, 1890. Serial No. 358,572. (No specimens.)

*To all whom it may concern:*

Be it known that I, JOHN H. MITCHELL, a citizen of the United States, residing at Washington, in the District of Columbia, have invented certain new and useful Improvements in Hoof-Salves; and I do hereby declare that the following is a full, clear, and exact description of the invention, which will enable others skilled in the art to which it appertains to make and use the same.

The object of my invention is to provide a salve for application to the hoofs of horses for the purpose of keeping them soft and in good condition and preventing contraction, corns, thrush, center and quarter cracks, and other ailments of the hoofs.

The ingredients of which my salve is composed consist of dry clay ground fine, tar, black oil, preferably crude petroleum, and vaseline. These are compounded together in about the following proportions: ground clay, two pounds; tar, (refined,) one-half pint; black oil, one pint; vaseline, one ounce. Any suitable means may be employed for effecting an intimate mixture of the elements.

The product, when ready for use, is in the form of a salve, and can be applied to the horse's hoofs either by the fingers or by means of a spade-shaped implement or otherwise, and is found to keep the hoofs soft and in good condition.

I claim as my invention—

The herein-described hoof-salve, consisting of the following ingredients in about the described proportions, viz: clay dried and ground, two pounds; tar, one-half pint; black oil, preferably crude petroleum, one pint; and vaseline, one ounce.

JOHN H. MITCHELL.

Witnesses:
   THOMAS DURANT,
   ALEX. S. STEUART.